S. LUCE.
Harvesters.
No. 141,938. Patented August 19, 1873.
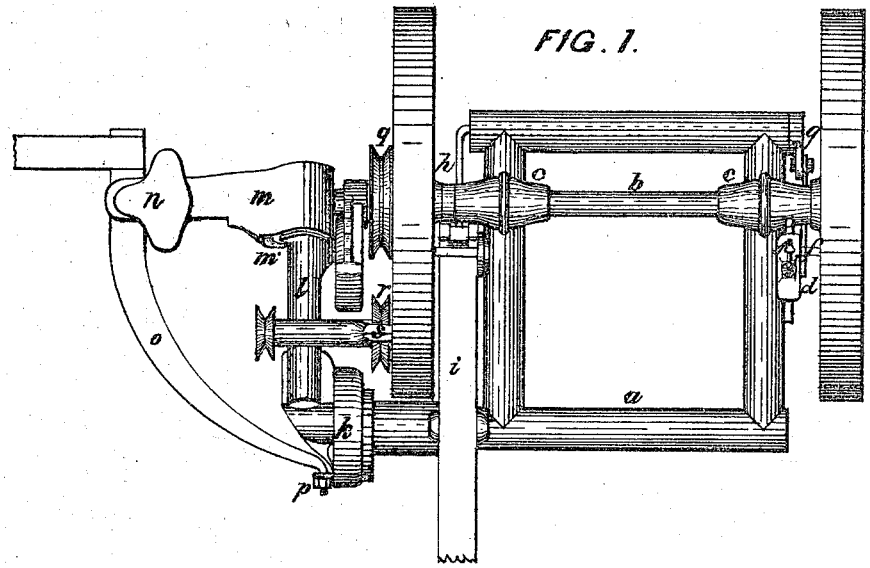
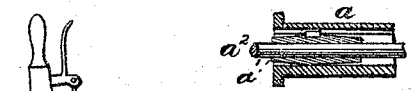
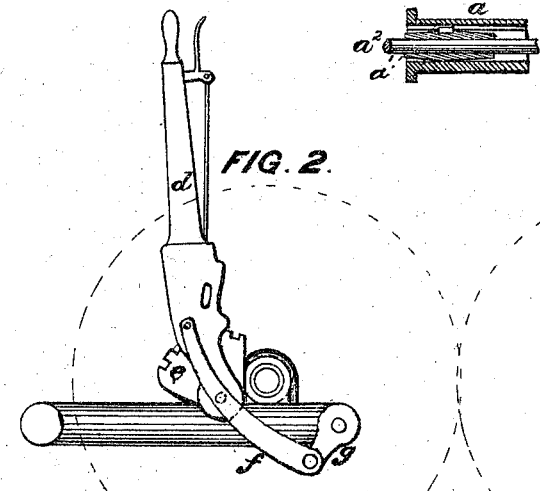
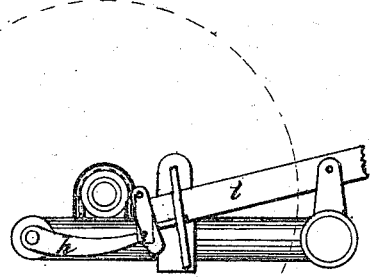

UNITED STATES PATENT OFFICE.

SIMEON LUCE, OF SYRACUSE, NEW YORK, ASSIGNOR TO WILLIAM WALLACE, OF SAME PLACE.

IMPROVEMENT IN HARVESTERS.

Specification forming part of Letters Patent No. 141,938, dated August 19, 1873; application filed April 10, 1873.

*To all whom it may concern:*

Be it known that I, SIMEON LUCE, of Syracuse, in the county of Onondaga and State of New York, have invented certain Improvements in Harvesters, of which the following is a specification:

This invention relates to the adjustable journal boxes and bearings that adapt themselves in the frame, and relieve the frame of much strain and unnecessary friction, and the frame being elevated or depressed by a powerful quick-acting device, convenient to the driver and wholly within his control, by which the pole can be adjusted with accuracy at all times, without the driver's moving from his seat.

The construction is as follows: The frame of the reaper $a$ is of cast-iron, and tubular, as in reapers heretofore made. The main axle $b$ is connected with adjustable journals $c$, affixed by staples to the frame, so as to be free to turn and adjust themselves to the axis. On the left-hand side of the frame a hand-lever, $d$, is pivoted, with a spring-pawl and stationary segment, $e$, to hold it in the desired position. A link, $f$, (see Fig. 2,) connects this lever $d$ with an arm, $g$, on a shaft that runs through the rear bar of the frame $a$, and bears on its right-hand end an arm, $h$, connected by a shackle with the rear end of the pole $i$, that has its fulcrum on the front bar of the frame $a$, as clearly shown in Fig. 3. By this device the rear end of the pole can be readily raised or depressed at the will of the driver, and held at any elevation, thus regulating the plane of the frame and the cutter-bar connected therewith. The front bar $a$ of the machine, being hollow, contains the bevel-wheel shaft $a^2$, which is fitted with adjustable bearings $a^1$, (see Fig. 4,) an important feature to the free running of the driving-gear. A flange on the projecting right-hand end of the front bar serves to attach the cap $k$ of the bevel-gear properly to the frame. At the point on the sleeve $l$ where the front side of the drag-bar brace comes there is a fixed collar, and on the drag-bar brace a hook, $m$, is affixed that hooks over said flange and holds the drag-bar brace to its place.

The drag-bar $o$ is formed and attached as in machines heretofore made; but, instead of being fastened with a hook or other unadjustable joint at the cap, it passes through an eye at $p$, in the line of draft, and has a screw cut on the end, to which a nut is fitted to draw it up and tighten it as the parts wear, which in practice is found very important in keeping all the working parts in proper relative position.

Having thus described my invention, I claim—

1. The adjustable journal-bearings $a^1$ and $c\ c$, constructed and arranged as described, combining the bevel-wheel shaft $a^2$ and the main shaft $b$ with the harvester-frame, substantially as and for the purposes set forth.

2. The combination of the lever $d$ with the rear end of the pole by means of the arms $g$ and $h$ and their shaft connection, substantially as specified.

SIMEON LUCE.

Witnesses:
    B. DELANEY,
    J. J. GREENOUGH.